Patented Apr. 20, 1954

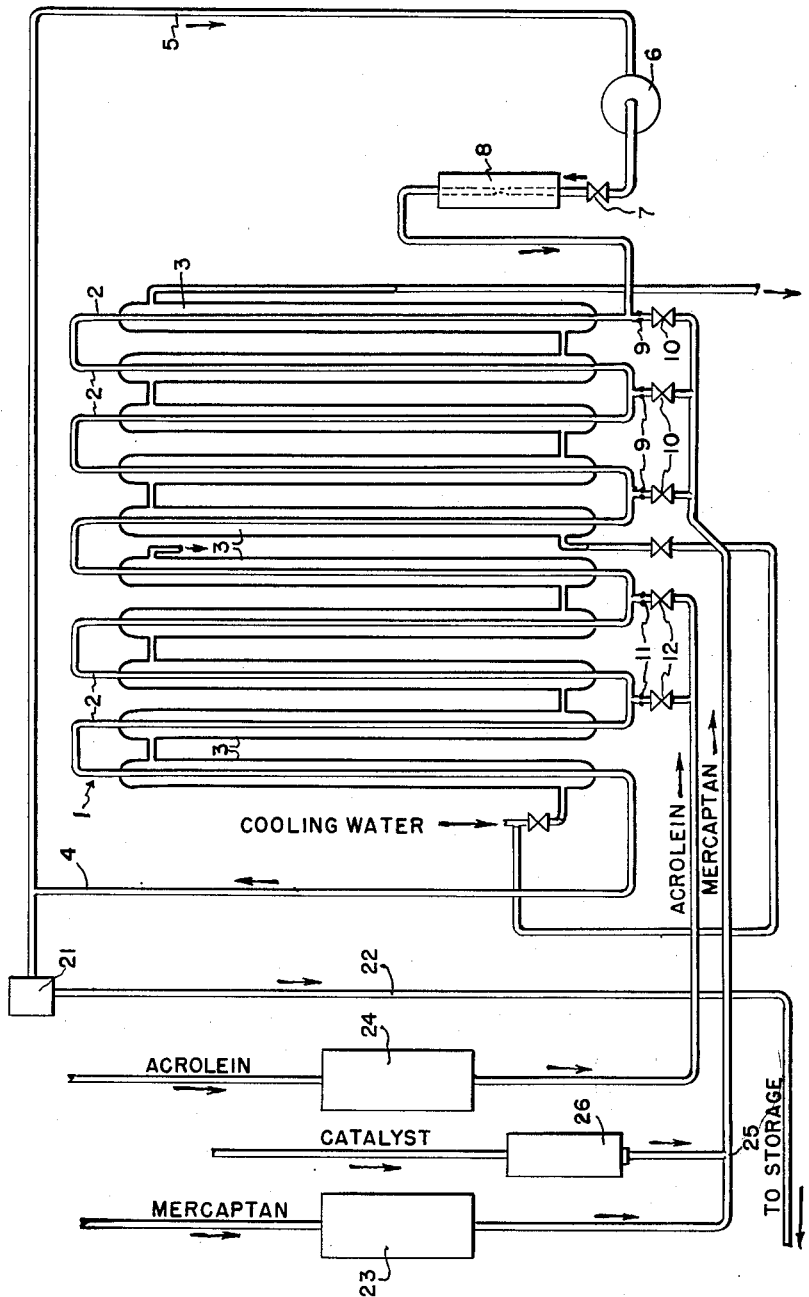

2,676,190

UNITED STATES PATENT OFFICE 2,676,190

PROCESS FOR THE MANUFACTURE OF BETA-METHYLMERCAPTO - PROPIONALDEHYDE

Robert A. Bernard, Upper Darby, Pa., and Richard R. Merner, New Castle County, Del., assignors to E. I. du Pont de Nemours & Company, Wilmington, Del., a corporation of Delaware Application October 23, 1951, Serial No. 252,672

4 Claims. (Cl. 260—601)

This invention relates to the snythesis of beta-methylmercapto-propionaldehyde, which is an intermediate in the synthesis of methionine. It is an object of this invention to provide an economical and efficient process for manufacturing the aforementioned intermediate from acrolein and methyl mercaptan in good yield. Various other objects and achievements of this invention will appear as the description proceeds.

U. S. Patent No. 2,485,236 describes a process of manufacturing beta-methylmercapto-propionaldehyde by reacting acrolein and methyl mercaptan in the presence of pyridine or other non-acidic catalyst. The process involves the use of an excess of the mercaptan, and the need of keeping the reaction mass cool (0° to 20° C.) is stressed. A yield of 98% is claimed, but the essentially 100% excess of methyl mercaptan must be removed and recovered, and the reaction requires refrigeration, as by the aid of brine.

In U. S. Patent No. 2,521,677 a similar reaction is described, using an organic peroxide as a catalyst. The need for cooling and for maintaining pressures not greatly in excess of atmospheric is emphasized, while the yield reported is of the order of 86%.

In U. S. Patent No. 2,523,633, the same reaction is carried out by the aid of a special group of catalysts, including copper acetate, and yields ranging from 24% to 90% are reported. Here again stress is laid on the need of atmospheric pressure and low temperatures. Initial temperature rises up to 75° C. are apparently tolerated, but an ice bath or brine cooling is recommended and it is pointed out that at temperatures as high as the reflux temperature of acrolein (about 53° C.), the danger of increased polymerization of acrolein exists. This patent also reports that although reactions in a sealed tube have been carried out successfully with very minute amounts of the reactants, the use of a sealed vessel with amounts comparable to practice on an industrial scale gives in all cases very low yields.

We have now found that contrary to the above teachings, very good yields on a commercial scale may be obtained in a sealed vessel, by using equivalent quantities of the reactants, and permitting the temperature of the reaction to rise above the reflux temperature of acrolein, if the procedure of contacting the reactants is modified according to the rules set forth more in detail hereinbelow. Now, according to our invention the reaction is divided into two stages. In the first stage, acrolein is fed into methyl mercaptan containing pyridine as a catalyst and maintained in an autoclave under sufficient pressure to keep the thiol in liquid state. Cooling with water may be applied, but no refrigeration is needed, and the internal temperature of the reaction mass may be allowed to rise as high as 40° to 100° C. This stage is maintained until about 67% to 90% of the theoretical quantity of acrolein has been entered and reacted.

The second stage consists of adding the remainder of the required acrolein (10% to 33%) at as rapid a rate as possible, and in any event at a rate not less than 3% of the overall theoretical quantity per minute. This stage and the recommended procedure for it seem to be an essential condition for good yields. None but highly speculative explanations for this phenomenon can be advanced at this stage, but our actual experience teaches that neglect of the above rule of procedure results in reduced yields.

The above two-stage rules of procedure may be condensed into a single rule which may be expressed as follows: When the concentration of beta-methylmercapto-propionaldehyde in methyl mercaptan (containing a catalyst) has increased beyond 67 mol-percent, the rate of addition of acrolein to consume the remaining free mercaptan should be stepped up. In still different words, the rate of feeding acrolein into methyl mercaptan (containing pyridine) should be as rapid as possible, if the mercaptan is admixed with quantities of beta-methylmercapto-propionaldehyde exceeding 67 mol-percent.

The last version of the rule is manifest in a modification of this invention in which the manufacture of the mentioned intermediate is carried out by a continuous process, on a commercial scale, as is more fully set forth hereinbelow.

Without limiting our invention, the following examples are given to illustrate our preferred mode of operation. Parts mentioned are by weight.

Example 1

A stainless-steel autoclave provided with an agitator and cooling jacket was charged with 1700 parts of methyl mercaptan analyzing 97.2% pure, and 10 parts pyridine. Then 1039 parts of acrolein, analyzing 95.7% pure, were added in five portions with cooling between additions. The temperature rose to as high as 76° C. during this period, as a little more than half of the equivalent amount of acrolein was added. During one minute additional 571 parts of acrolein were entered so that 80% of the total amount of acrolein was charged up to this point. Ten minutes later the remaining 20% of the acrolein charge (405 parts) was added during half a minute. The reaction mass was cooled over a period of 10 minutes and sampled. Analysis indicated a 98% yield of beta-methylmercapto-propionaldehyde. The product was of good purity and was suitable directly for use in the preparation of α - hydroxy - γ - methylmercapto - butyronitrile, which is the next step in the synthesis of methionine.

*Example 2*

To the same autoclave as in Example 1, were charged 1700 parts of methyl mercaptan of 97.2% purity. Addition of acrolein was begun and the temperature was allowed to rise rapidly to 55°–60° C., at which point it was maintained by the addition of further acrolein, 1340 parts of acrolein (96% purity) were thus introduced. The last third of the acrolein (670 parts) was then added over a period of eight minutes, after which the reaction mass was cooled to room temperature. The yield of beta-methylmercapto-propionaldehyde was 96%.

As a general proposition, the rate at which the first two thirds of the acrolein is added to the methane-thiol is not critical, provided of course that it is not added so fast that the cooling means available cannot maintain the desired temperature (say 40° to 100° C.). During this part of the reaction, the acrolein may be added either continuously or in separate increments.

On the other hand, at least the last tenth and preferably the last third of the acrolein should be added at as fast a rate as possible (without exceeding the temperature limit selected), preferably in a single increment, and at least as fast as 3% of the overall quantity per minute.

Furthermore, although the rate of addition of only the last third of the acrolein is critical, it is often convenient, provided that sufficient cooling is provided, to add the last half of the acrolein at the same rapid rate as is required for the last portion. This is illustrated in the following example.

*Example 3*

A stainless-steel autoclave like that used in Example 1 was charged with 1700 parts of methyl mercaptan analyzing 97.2% pure, and 10 parts of pyridine. Then 1095 parts of acrolein of 92.8% purity were added in four portions with cooling of the charge between additions. The remaining 980 parts of acrolein (47% of the total) were then added in one increment during 1 minute, and the reaction mass was cooled over a period of 10 minutes and sampled. The temperature rose to a maximum of 72° C. during the earlier additions, and to 56° C. during the last acrolein addition. Analysis indicated a 97% yield of beta-methylmercapto-propionaldehyde.

As illustrated by the foregoing examples, the reaction is preferably carried out without a solvent and at a pressure great enough to maintain both reactants in the liquid phase. Preferably, the reaction mass is cooled by circulating water through a jacket, a submerged coil, or other heat-exchange device. The preferred temperature of the reaction is about 40° to 100° C. and the preferred proportion of pyridine is between about 0.2% and 2.0% based on the weight of the mercaptan, although the wider limits given in the above cited patents also give satisfactory results. In lieu of pyridine, other known catalysts for this reaction, for instance those disclosed in the 3 patents above cited, may be used.

It is not absolutely necessary to start with a reaction mass containing only the methyl mercaptan (and catalyst). Instead, one may start with any reaction mass containing beta-methylmercapto-propionaldehyde and free methane thiol. If the molal proportion of the latter is in the range of 33% to 10% of the total moles of organic compounds, (exclusive of catalyst) in the reaction mass, the requisite quantity of acrolein to combine with said free thiol should be entered all at once or in any event at a rate not less than 3 mol-per cent (based on said total moles) per minute.

This circumstance enables our process to be readily adapted for continuous operation on a plant scale. Thus, a portion of the finished reaction product (consisting almost exclusively of beta-methylmercapto-propionaldehyde and catalyst) may be recycled through any convenient continuous reactor, for instance a pipe, into which a stream of fresh methyl mercaptan is piped through a side line (or a plurality of side lines). The rate of feed of the mercaptan is such that after due progress along the length of the reactor (and resulting intermixture), the mixture will contain from 11 to 50 moles, and even up to 100 moles, of methane-thiol for each 100 moles of the reaction product. Then, through a side line (or a plurality of side lines) entering beyond this point, acrolein is entered at such a rate as to bring about rapid intermixing of the free thiol with an equivalent quantity of acrolein, the word rapid here being construed to mean a mixing rate of not less than 3 moles of acrolein per minute for each 100 moles of total organic compounds (exclusive of catalyst) passing through per minute.

The rate of entry of acrolein is subjected to two controls. First, the quantity entered per minute is controlled by a suitable valve or meter so as to correspond mole for mole to the quantity of free mercaptan passing through the same section per minute. Secondly, the velocity of the individual particles in either the acrolein stream or the main stream is made so high as to produce turbulence in the vicinity of the acrolein entry, thereby assuring rapid intermixing thereof with the main stream.

Such second control may be achieved without any special provisions in the apparatus, for instance by increasing the velocity of the main stream to the point where it becomes turbulent. Or, it may be brought about, by mixing the streams in a Venturi section, or again by entering the acrolein stream through an orifice from which it emerges in the form of a jet. Furthermore, the same effect may also be achieved by inserting a rapid agitator in the reactor in the vicinity of the acrolein port of entry, or by other similar, per se known, mechanical or hydraulic expedients.

For the purpose of clearer understanding of the operation of our invention in a continuous apparatus, reference is made to the accompanying drawing which forms an integral part of this specification.

The sole figure on the drawing is a diagrammatic flow-sheet of materials in a continuous process according to this invention.

In this figure, 1 is a continuous pipe-line reactor, made up of a plurality of pipes 2, 2 coupled together in series, and equipped with cooling water jackets 3, 3. The output of the reactor is discharged through pipe-line 4 which is sealed by a back-pressure regulator 21 for the purpose of maintaining the pressure in the reactor at a sufficiently high value to keep the volatile reactants in liquid state.

Branching off from discharge pipe 4 is a recycle line 5 through which, by the aid of pump 6, control valve 7 and flow meter 8, a controlled portion of the reaction product is returned into the reactor. At one or more points, 9, 9, through suitable orifices, fresh methyl mercaptan is injected in the form of a jet or a plurality of jets, the volume of each jet being controlled by valve 10, as indicated at these points. The total volume of mercaptan entered is controlled by the metering pump 23 or, if preferred, by a combination of flow meters and control valves.

Further down the line, and preferably at a distance sufficiently far from the methyl mercaptan inlets to permit the heat of solution generated by the entry of the methyl mercaptan to be dissipated through the cooling jackets, acrolein is entered at one or more points, through the orifices 11, 11. Suitable valves 12, 12 are employed at these points to control the volume passing through each orifice. The total volume of acrolein entered is controlled by the metering pump 24 or, if preferred, by a combination of flow meters and control valves.

To replenish the losses of catalyst through the portion of the reaction product taken off continuously at the end of the discharge pipe 22, pyridine is entered into the methyl mercaptan stream at point 25, its quantity being controlled by a metering pump 26 or by a combination of flow meters and control valves.

The operation of this apparatus is continuous, as will by now be very clear from the aforegoing description. The entire process is controlled, as already indicated, with two principal objects in view: (1) To keep the maximum temperature at any point in the system within the limits initially selected, in the range of 40° C. to 100° C.; (2) to effect mixing of the acrolein and the reaction mass as rapidly as possible, especially if the mole-fraction of the methyl mercaptan at the point of entry of the acrolein is below 0.33.

In actual test runs in a continuous apparatus consisting of 100 feet of steel pipe, the following details were observed with the following results:

Methyl mercaptan, purity 98%, containing about 0.6% of pre-mixed pyridine, admitted through a single inlet at the beginning of the reactor. Acrolein, purity 90%, admitted through a single inlet, 50 feet downstream. Reactor operating pressure, 150 p. s. i. gage.

|  | Test-run A | Test-run B |
|---|---|---|
| Methyl mercaptain + pyridine feed rate p. p. m. | 27.9 | 31.4 |
| Acrolein feed rate p. p. m. | 34.8 | 39.2 |
| Product take-off rate p. p. m. | 62.7 | 70.6 |
| Moles of mercaptain per mole of acrolein | 1.02 | 1.02 |
| Moles of aldehyde recycled per mole of acrolein | 1.11 | 1.95 |
| Cooling water temperature in jackets ° C. | 24 | 21 |
| Maximum temperature after mercaptan addition ° C. | 46 | 66 |
| Maximum temperature after acrolein addition ° C. | 100 | 44 |
| Average yield of product, based on acrolein fed percent | 96 | 95 |

"p. p. m." stands for parts per minute.

It will be understood that the details of procedure hereinabove set forth may be varied widely within the skill of those engaged in this art.

We claim as our invention:

1. In the process of producing beta-methyl-mercapto-propionaldehyde, the improvement which consist of feeding acrolein into a sealed vessel containing methyl mercaptan and a catalyst at a temperature between 40° C. and 100° C. until not less than 0.67 and not more than 0.90 moles of acrolein have been entered for each mole of methyl mercaptan entered into the vessel, and then adding the remainder of the theoretical proportion of arcolein at the maximum rate consistent with the maintenance of a temperature of 40° to 100° C.

2. In the process of producing beta-methylmercapto-propionaldehyde, the step which consists of feeding acrolein into a reaction mass containing beta-methylmercaptopropionaldehyde and methyl mercaptan under pressure and at a temperature between 40° and 100° C., the concentration of the beta-methyl mercapto-propionaldehyde being between 67 and 90 mol-percent and the reaction mass containing further a catalytic quantity of pyridine, said feeding being done at such a rate as to enter not less than 3 moles of acrolein per minute for each 100 moles of total organic compounds present in the reaction mass.

3. A process for producing beta methylmercaptopropionaldehyde, which comprises feeding acrolein into methyl mercaptan maintained in liquid state, under pressure, at a temperature between 40° and 100° C. and containing pyridine in quantity corresponding to between 0.2% and 2% by weight of the mercaptan, said feeding being done at a rate permitting the maintenance of a temperature in the specified range and being continued until between 67 and 90 moles of acrolein have been entered per 100 moles of methyl mercaptan employed in the reaction, and then adding the remainder of the theoretically requisite acrolein at such a rate as to enter not less than 3 moles of acrolein per minute for each 100 moles of total organic compounds present in the reaction mass.

4. A continuous process for producing beta-methylmercaptopropionaldehyde, which comprises feeding continuously through a reactor a reaction mass consisting of beta-methylmercaptopropionaldehyde and a catalytic quantity of pyridine, further feeding into said reactor, methyl mercaptan to intermix with said reaction mass and to form eventually a stream containing not less than 11 moles of the mercaptan for each 100 moles of said aldehyde, and finally entering into the stream a volume of acrolein calculated to react with the free mercaptan present, the system being maintained at a temperature between 40° and 100° C. and under sufficient pressure to keep the volatile reactants in liquid state, and the liquid mass being kept in a state of turbulence in the region of entry of said acrolein whereby to assure rapid intermixing of the streams.

References Cited in the file of this patent

UNITED STATES PATENTS

| Number | Name | Date |
|---|---|---|
| 2,485,236 | Gresham et al. | Oct. 18, 1949 |
| 2,521,677 | Vander Weele | Sept. 12, 1950 |
| 2,523,633 | Pierson et. al. | Sept. 26, 1950 |